United States Patent
Schwark, Jr. et al.

(10) Patent No.: US 8,443,586 B2
(45) Date of Patent: May 21, 2013

(54) VARIABLE AREA FAN NOZZLE BEARING TRACK

(75) Inventors: Fred W. Schwark, Jr., Simsbury, CT (US); Oliver V. Atassi, Longmeadow, MA (US); William D. Owen, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 706 days.

(21) Appl. No.: 12/624,525

(22) Filed: Nov. 24, 2009

(65) Prior Publication Data

US 2011/0120081 A1 May 26, 2011

(51) Int. Cl.
*F02K 3/075* (2006.01)
*F02K 1/12* (2006.01)
*F02K 1/72* (2006.01)

(52) U.S. Cl.
USPC ......... 60/226.3; 60/771; 60/226.2; 244/110 B (58) Field of Classification Search ................. 60/226.3, 60/226.2, 771, 226.1, 230; 244/110 B
See application file for complete search history.

(56) References Cited

U.S. PATENT DOCUMENTS

| | | | |
|---|---|---|---|
| 3,161,018 A | 12/1964 | Sandre | |
| 3,673,802 A | 7/1972 | Krebs et al. | |
| 3,779,010 A | 12/1973 | Chamay et al. | |
| 3,820,719 A | 6/1974 | Clark | |
| 3,879,941 A | 4/1975 | Sargisson | |
| 3,931,708 A | 1/1976 | Motycka | |
| 4,043,121 A | 8/1977 | Thomas et al. | |
| 4,068,471 A | 1/1978 | Simmons | |
| 4,085,583 A | 4/1978 | Klees | |
| 4,175,384 A | 11/1979 | Wagenknecht et al. | |
| 4,327,548 A | 5/1982 | Woodward | |
| 4,409,788 A | 10/1983 | Nash et al. | |
| 4,564,160 A * | 1/1986 | Vermilye | ................... 244/110 B |
| 5,101,533 A * | 4/1992 | Stenger et al. | ................... 16/340 |
| 5,261,227 A | 11/1993 | Giffin, III | |
| 5,388,964 A | 2/1995 | Ciokajlo et al. | |
| 5,402,638 A | 4/1995 | Johnson | |
| 5,404,713 A | 4/1995 | Johnson | |
| 5,524,847 A | 6/1996 | Brodell et al. | |
| 5,577,381 A | 11/1996 | Eigenbrode et al. | |

(Continued)

FOREIGN PATENT DOCUMENTS

| | | |
|---|---|---|
| EP | 0567277 | 10/1993 |
| FR | 1503425 | 11/1967 |
| GB | 2189550 | 10/1987 |
| WO | 2009029401 | 3/2009 |

OTHER PUBLICATIONS

PCT International Search Report and Written Opinion mailed Mar. 16, 2012.

(Continued)

*Primary Examiner* — William H Rodriguez
*Assistant Examiner* — Carlos A Rivera
(74) *Attorney, Agent, or Firm* — Carlson, Gaskey & Olds PC (57) ABSTRACT

A variable area fan nozzle for a high-bypass gas turbine engine includes a first track slider movable relative to the hinge beam along a first interface. A second track slider is movable relative to the first track slider along a second interface that includes a bearing assembly. A VAFN cowl is mounted to the second track slider.

24 Claims, 9 Drawing Sheets

U.S. PATENT DOCUMENTS

| | | | |
|---|---|---|---|
| 5,586,431 A | 12/1996 | Thonebe et al. | |
| 5,593,112 A | 1/1997 | Maier et al. | |
| 5,655,360 A | 8/1997 | Butler | |
| 5,778,659 A * | 7/1998 | Duesler et al. | 60/226.1 |
| 5,794,432 A | 8/1998 | Dunbar et al. | |
| 5,806,302 A * | 9/1998 | Cariola et al. | 60/204 |
| 5,806,303 A | 9/1998 | Johnson | |
| 5,809,772 A | 9/1998 | Giffin, III et al. | |
| 5,853,148 A | 12/1998 | Standish et al. | |
| 5,867,980 A | 2/1999 | Bartos | |
| 5,988,980 A | 11/1999 | Busbey et al. | |
| 6,292,763 B1 | 9/2001 | Dunbar et al. | |
| 6,318,070 B1 | 11/2001 | Rey et al. | |
| 6,546,716 B2 | 4/2003 | Lair | |
| 6,584,763 B2 * | 7/2003 | Lymons et al. | 60/226.2 |
| 6,729,575 B2 | 5/2004 | Bevilaqua | |
| 6,735,936 B2 | 5/2004 | Rey et al. | |
| 6,901,739 B2 | 6/2005 | Christopherson | |
| 7,004,047 B2 | 2/2006 | Rey et al. | |
| 7,174,704 B2 | 2/2007 | Renggli | |
| 2006/0101807 A1 | 5/2006 | Wood et al. | |
| 2008/0190095 A1 * | 8/2008 | Baran | 60/226.3 |
| 2008/0219835 A1 * | 9/2008 | Freling et al. | 415/173.4 |
| 2008/0273961 A1 * | 11/2008 | Rosenkrans et al. | 415/13 |

OTHER PUBLICATIONS

PCT International Search Report and Written Opinion, PCT/US2010/057974, mailed Nov. 4, 2011.

* cited by examiner

VARIABLE AREA FAN NOZZLE BEARING TRACK

BACKGROUND

The present disclosure relates to a gas turbine engine, and more particularly to a turbofan engine having a variable area fan nozzle (VAFN) with a VAFN bearing track that increases a flutter margin.

Gas turbine engines which have an engine cycle modulated with a variable area fan nozzle (VAFN) provide a smaller fan exit nozzle during cruise conditions and a larger fan exit nozzle during take-off and landing conditions.

A design requirement for the VAFN is to maintain structural integrity throughout the flight envelope of the aircraft. Due to flow turbulence and mechanical vibration, the VAFN may be subject to both tonal and broadband aerodynamic loads that cause the nozzle to elastically deflect from a mean position.

SUMMARY

A variable area fan nozzle for a high-bypass gas turbine engine according to an exemplary aspect of the present disclosure includes a first track slider movable relative to the hinge beam along a first interface. A second track slider is movable relative to the first track slider along a second interface that includes a bearing assembly. A VAFN cowl is mounted to the second track slider.

A nacelle assembly for a high-bypass gas turbine engine according to an exemplary aspect of the present disclosure includes a variable area fan nozzle having a first fan nacelle section and a second fan nacelle section. The second fan nacelle section includes a VAFN cowl movable relative to the first fan nacelle section along a track assembly to vary a fan nozzle exit area and adjust fan bypass airflow. The track assembly includes a first track slider movable relative to a hinge beam along a first interface and a second track slider movable relative to the first track slider along a second interface that includes a bearing assembly, the second track slider mounted to the VAFN cowl.

A high-bypass gas turbine engine according to an exemplary aspect of the present disclosure includes a core engine defined about an axis, a gear system driven by the core engine and a turbofan driven by the gear system about the axis. A core nacelle is defined at least partially about the core engine and a fan nacelle is mounted at least partially around the core nacelle to define a fan bypass flow path. A variable area fan nozzle includes a first fan nacelle section and a second fan nacelle section in which the second fan nacelle section includes a VAFN cowl movable relative to the first fan nacelle section along a track assembly to vary a fan nozzle exit area and adjust fan bypass airflow. The track assembly includes a first track slider movable relative to a hinge beam along a first interface and a second track slider movable relative to the first track slider along a second interface that includes a bearing assembly, the second track slider mounted to the VAFN cowl.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
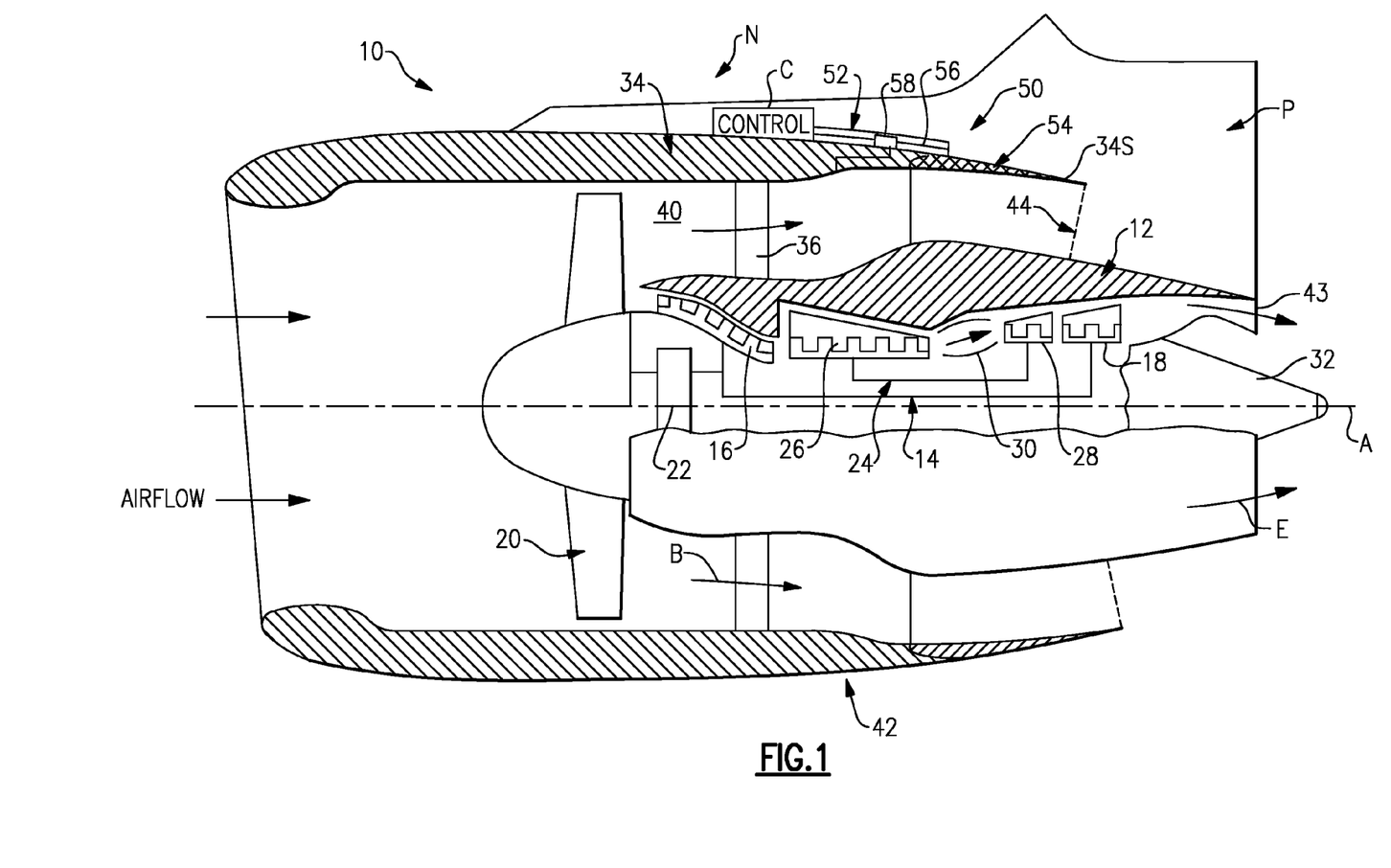
FIG. 1 is a general schematic partial fragmentary view of an exemplary gas turbine engine embodiment for use with the present invention.

FIG. 1 illustrates a general partial fragmentary schematic view of a gas turbofan engine 10 suspended from an engine pylon P within an engine nacelle assembly N. The turbofan engine 10 includes a core engine within a core nacelle 12 that houses a low spool 14 and high spool 24. The low spool 14 includes a low pressure compressor 16 and low pressure turbine 18. The low spool 14 also drives a fan section 20 through a gear train 22. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine with a bypass ratio greater than ten (10:1), a turbofan diameter significantly larger than that of the low pressure compressor 16, and the low pressure turbine 18 with a pressure ratio greater than 5:1. The gear train 22 may be an epicycle gear train such as a planetary gear system or other gear system with a gear reduction ratio of greater than 2.5:1. It should be understood, however, that the above parameters are only exemplary of one non-limiting embodiment of a geared architecture engine and that this disclosure is applicable to other gas turbine engines including direct drive turbofans.

Airflow enters a fan nacelle 34 which at least partially surrounds the core nacelle 12. The fan section 20 communicates airflow into the core nacelle 12 to power the low pressure compressor 16 and the high pressure compressor 26. Core airflow compressed by the low pressure compressor 16 and the high pressure compressor 26 is mixed with the fuel in the combustor 30 and expanded over the high pressure turbine 28 and low pressure turbine 18. The turbines 28, 18 are coupled for rotation with respective spools 24, 14 to rotationally drive the compressors 26, 16 and through the gear train 22, the fan section 20 in response to the expansion. A core engine exhaust E exits the core nacelle 12 through a core nozzle 43 defined between the core nacelle 12 and a tail cone 32.

The core nacelle 12 is supported within the fan nacelle 34 by circumferentially spaced structures 36 often referred to as Fan Exit Guide Vanes (FEGVs). A bypass flow path 40 is defined between the core nacelle 12 and the fan nacelle 34. The engine 10 generates a high bypass flow arrangement with a bypass ratio in which approximately eighty percent of the airflow which enters the fan nacelle 34 becomes bypass flow B. The bypass flow B communicates through the generally annular bypass flow path 40 and is discharged from the engine 10 through a variable area fan nozzle (VAFN) 42 which defines a nozzle exit area 44 between the fan nacelle 34 and the core nacelle 12 at a fan nacelle end segment 34S of the fan nacelle 34 downstream of the fan section 20.

Thrust is a function of density, velocity, and area. One or more of these parameters can be manipulated to vary the amount and direction of thrust provided by the bypass flow B. The VAFN 42 operates to effectively vary the area of the fan nozzle exit area 44 to selectively adjust the mass flow of the bypass flow B in response to a controller C. Low pressure ratio turbofans are desirable for their high propulsive efficiency. However, low pressure ratio fans may be inherently susceptible to fan stability/flutter problems at low power and low flight speeds. The VAFN 42 allows the engine to change to a more favorable fan operating line at low power, avoiding the instability region and still provide the relatively smaller nozzle area necessary to obtain a high-efficiency fan operating line at cruise speeds.

A significant amount of thrust is provided by the bypass flow B due to the high bypass ratio. The fan section 20 of the engine 10 is designed for a particular flight condition—typically cruise at 0.8M and 35,000 feet. As the fan blades within the fan section 20 are efficiently designed at a particular fixed stagger angle for an efficient cruise condition, the VAFN 42 is operated to effectively vary the fan nozzle exit area 44 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

Figure 2:
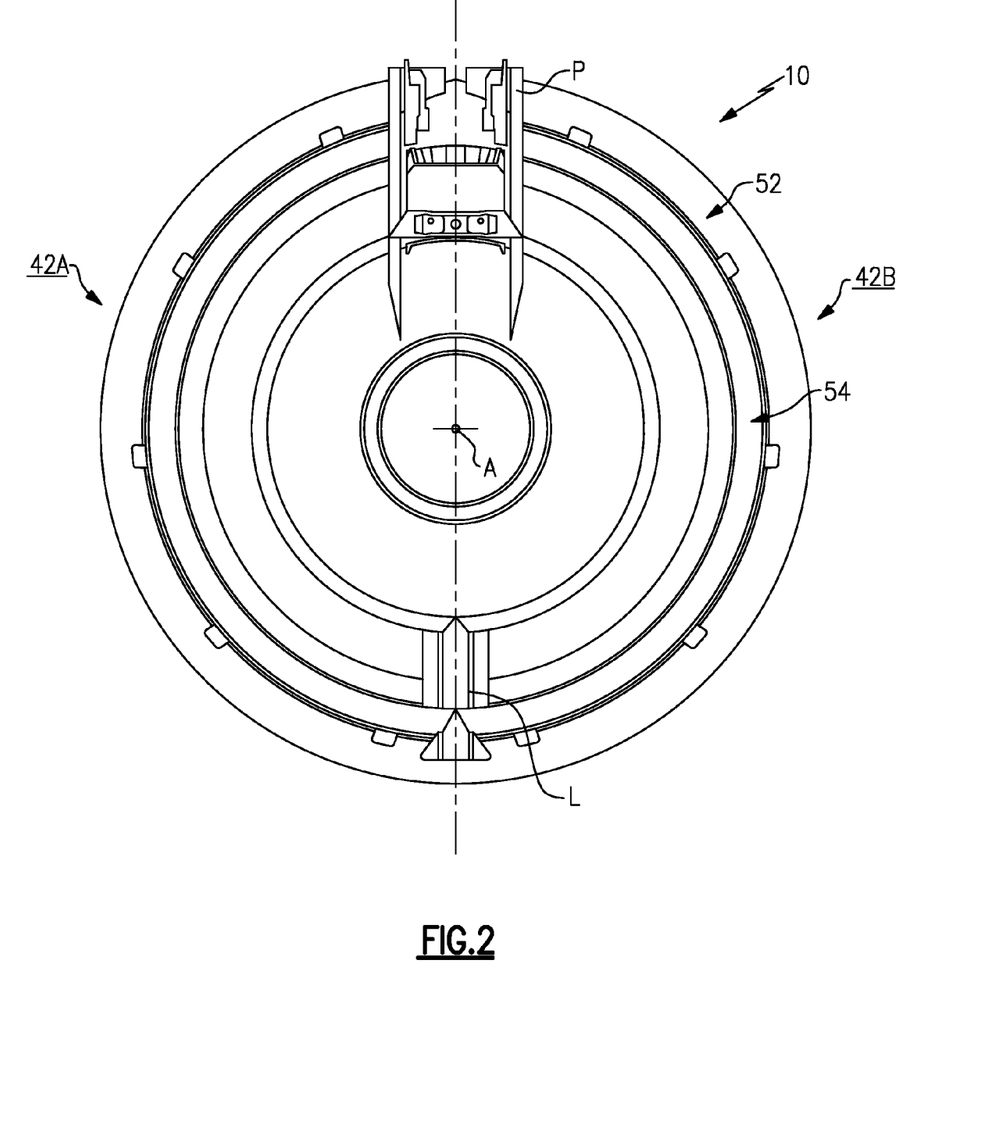
FIG. 2 is a rear view of the engine.

The VAFN 42 may be separated into at least two sectors 42A-42B (FIG. 2) defined between the pylon P and a lower Bi-Fi splitter L which typically interconnects a larger diameter fan duct reverser cowl and a smaller diameter core cowl. It should be understood that although two segments are illustrated, any number of sectors may alternatively or additionally be provided.

Figure 3A:
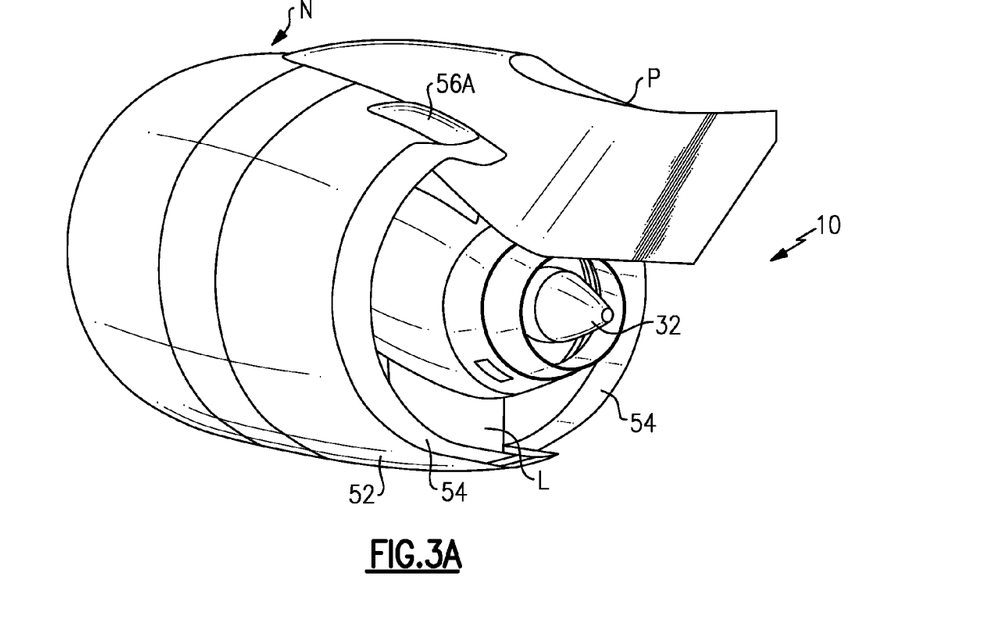
FIG. 3A is a perspective view of the engine with the VAFN in a closed position.
Figure 3B:
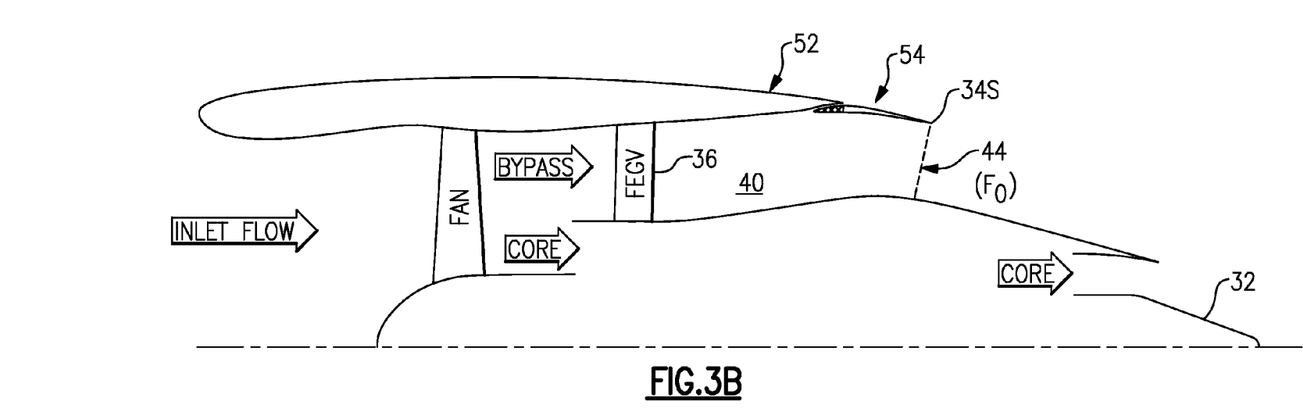
FIG. 3B is a sectional side view of the VAFN in a closed position.
Figure 4A:
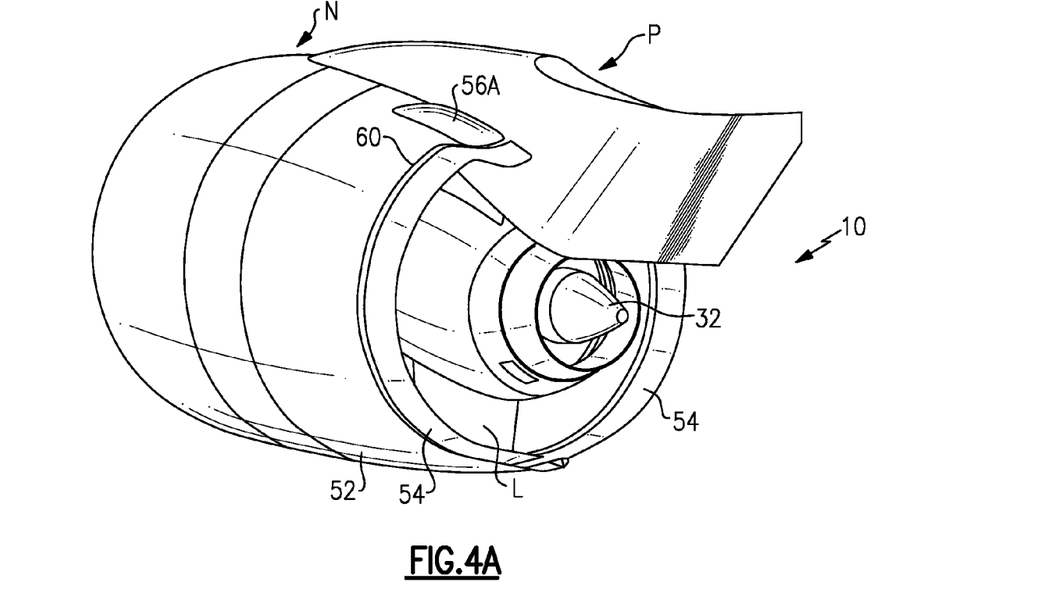
FIG. 4A is a perspective view of the engine with the VAFN in an open position.
Figure 4B:
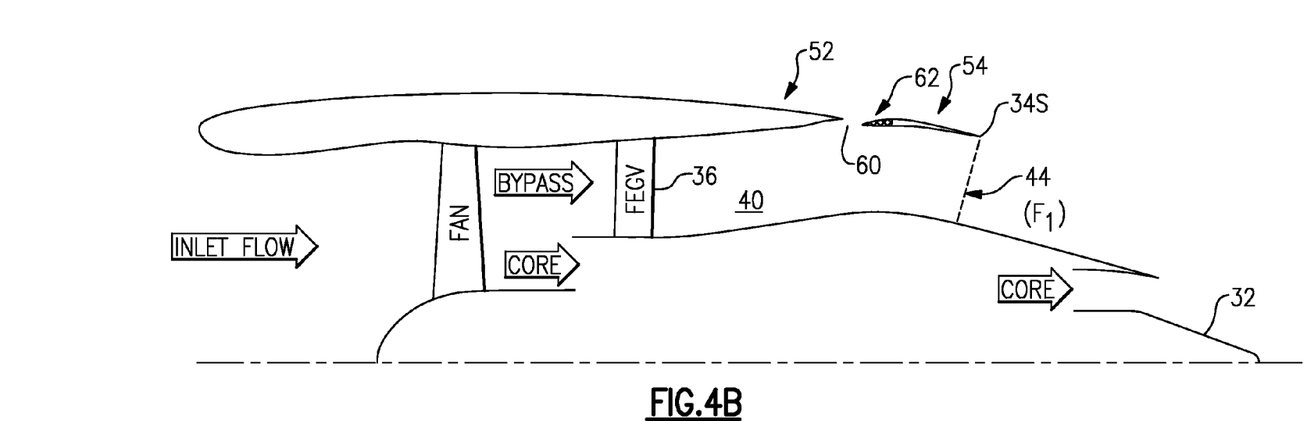
FIG. 4B is a sectional side view of the VAFN in an open position.

The VAFN 42 selectively defines an auxiliary port system 50 having a first fan nacelle section 52 that include a thrust reverser cowl and a second fan nacelle section 54 that includes a VAFN cowl movably mounted relative the first fan nacelle section 52. The second fan nacelle section 54 axially slides along the engine axis A relative the fixed first fan nacelle section 52 to change the effective area of the fan nozzle exit area 44. That is, as the stroke of the second fan nacelle section 54 varies, the leading edge of the second fan nacelle section 54 is either covered by the first fan nacelle section 52 (FIGS. 3A and 3B) or the leading edge is uncovered to define an auxiliary port 60 (FIGS. 4A and 4B).

The second fan nacelle section 54, in one non-limiting embodiment, slides along a track assembly 56A, 56B within each sectors 42A-42B (FIGS. 3A and 4A) in response to an actuator 58. The track assembly 56A, 56B may be located from the first fan nacelle section 52 adjacent the respective pylon P and the lower Bi-Fi splitter L.

The VAFN 42 changes the physical area and geometry of the bypass flow path 40 during particular flight conditions. The bypass flow B is effectively altered by sliding of the second fan nacelle section 54 relative the first fan nacelle section 52 between a closed position (FIGS. 3A and 3B) and an open position (FIGS. 4A and 4B). Movement of the second fan nacelle section 54 forward along the track assembly 56A, 56B toward the first fan nacelle section 52 closes the auxiliary port 60 between the second fan nacelle section 54 and the first fan nacelle section 52 to essentially provide a decrease in the fan nozzle exit area 44 toward exit area F0 (FIG. 4A). Movement of the second fan nacelle section 54 aftward along the track assembly 56A, 56B away from the first fan nacelle section 52 opens the auxiliary port 60 between the second fan nacelle section 54 and the first fan nacelle section 52 to essentially provide an increased fan nozzle exit area 44 toward exit area F1 (FIG. 4B). That is, exit area F1 with auxiliary port 60 (FIG. 4B) is greater than exit area F0 (FIG. 3B).

In operation, the VAFN 42 communicates with the controller C to move the second fan nacelle section 54 relative the first fan nacelle section 52 of the auxiliary port system 50 to effectively vary the area defined by the fan nozzle exit area 44. Various control systems including an engine controller or an aircraft flight control system may also be usable with the present invention. By adjusting the axial position of the entire periphery of the second fan nacelle section 54 in which all sectors are moved simultaneously, engine thrust and fuel economy are maximized during each flight regime by varying the fan nozzle exit area. By separately adjusting the sectors of the second fan nacelle section 54 to provide an asymmetrical fan nozzle exit area 44, engine bypass flow is selectively vectored to provide, for example only, trim balance, thrust controlled maneuvering, enhanced ground operations and short field performance.

Figure 5:
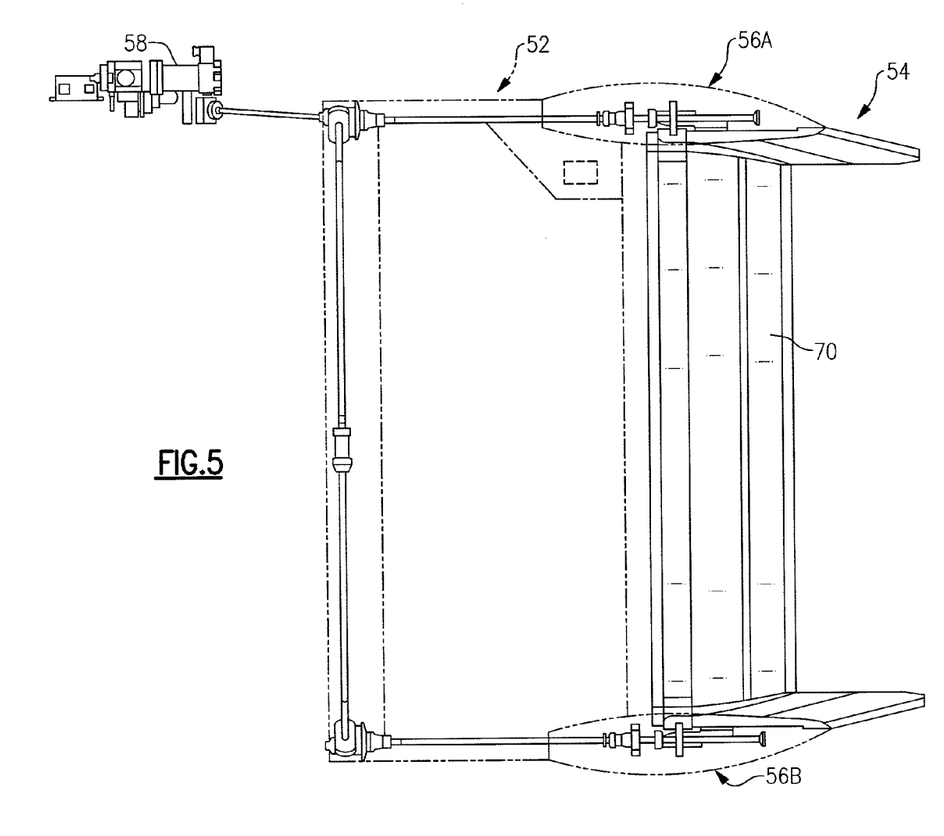
FIG. 5 is a partial side view of the VAFN.

Referring to FIG. 5, the second fan nacelle section 54 includes a first and second VAFN cowl 70 within each sector 42A-42B. Each VAFN cowl 70 is respectively supported by the track assembly 56A, 56B. Whereas each sector 42A-42B is essentially identical, only track assembly 56A will be described in detail herein.

Figure 6:
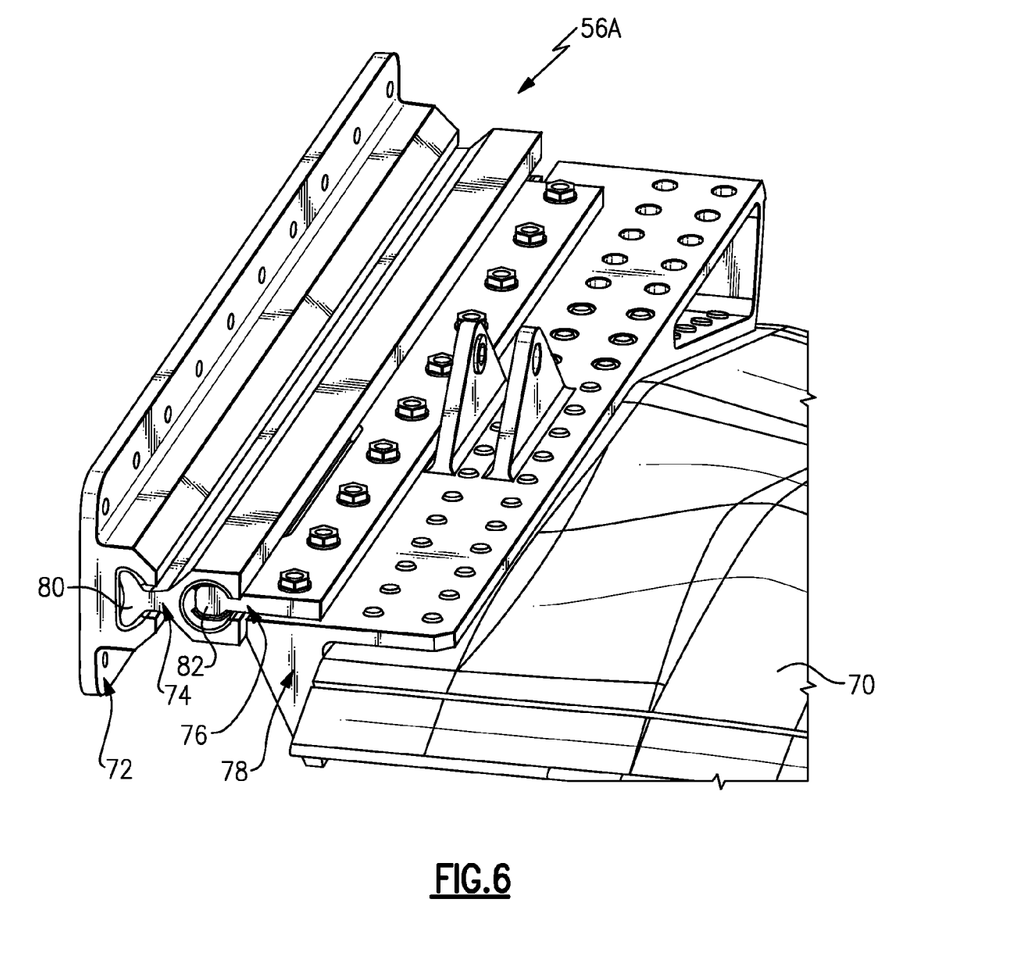
FIG. 6 is a perspective view of one track assembly upon which a thrust reverser assembly and a VAFN cowl are positioned.

Referring to FIG. 6, the track assembly 56A generally includes a hinge beam 72, a first track slider 74, a second track slider 76 and a VAFN cowl mount 78. The hinge beam 72 may be fixed to the first fan nacelle section 52, the engine pylon P, lower Bi-Fi splitter L or other fixed structure. The first track slider 74 slides relative the hinge beam 72 and the second track slider 76 slides relative the first track slider 74. The first track slider 74 generally supports a thrust reverse assembly and the second track slider 76 supports the VAFN cowl 70 such that the thrust reverse assembly and the VAFN cowl 70 may be operated in an independent manner.

The first track slider 74 defines a first interface 80 with the hinge beam 72 such as a dove-tail interface. The second track slider 76 defines a second interface 82 with the first track slider 74 such as a semi-cylindrical interface. In one non-limiting embodiment, the second interface 82 is more closely controlled than the first interface 80. It should be understood that various interfaces may alternatively be utilized.

Figure 7:
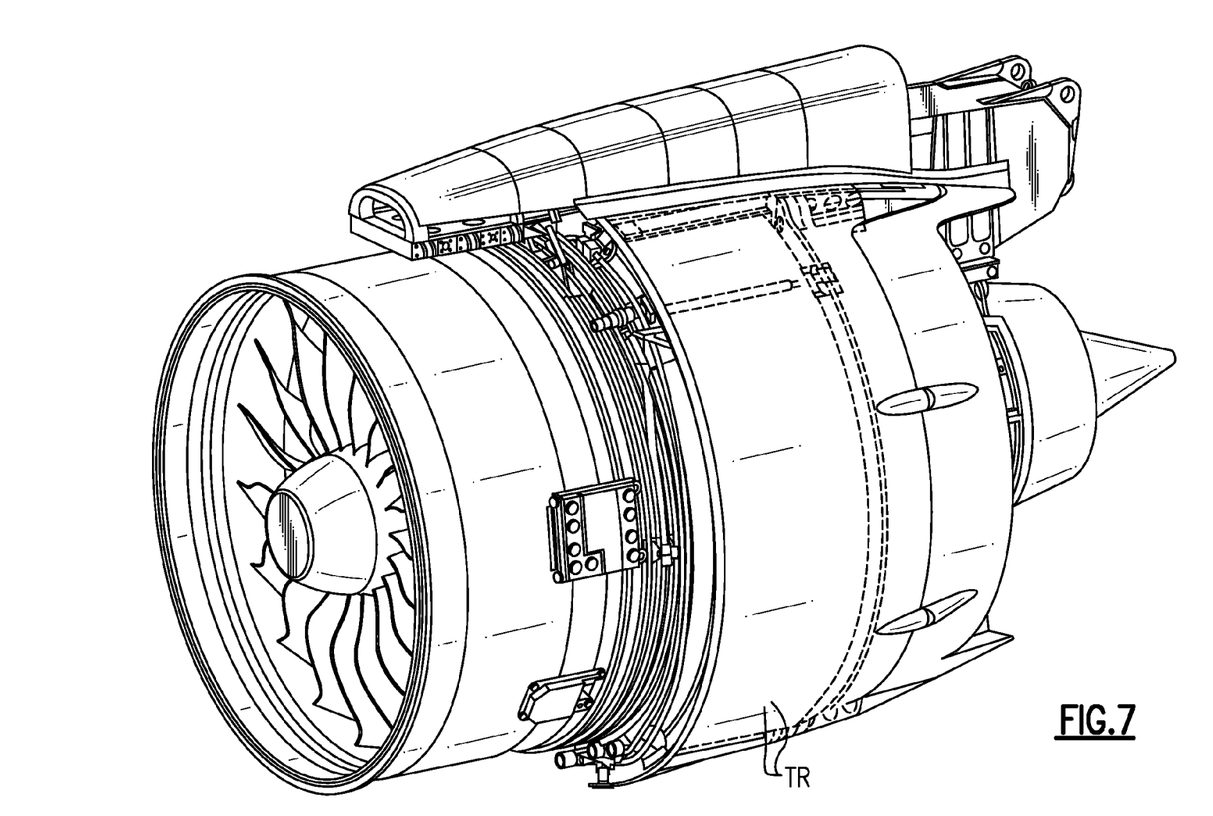
FIG. 7 is a perspective view of the track assembly of FIG. 6 with the thrust reverser assembly and the VAFN cowl in a closed position.
Figure 8:
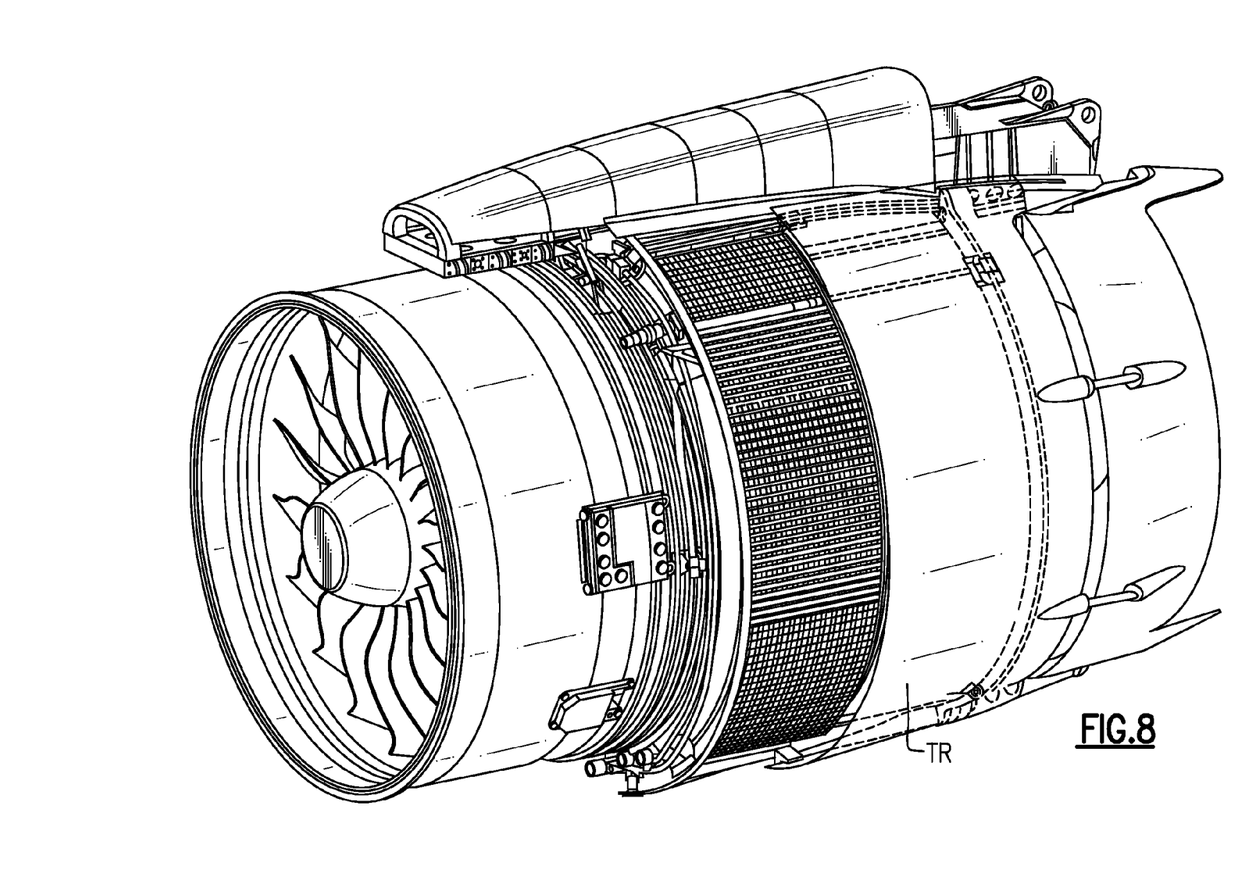
FIG. 8 is a perspective view of the track assembly of FIG. 6 with the thrust reverser assembly and the VAFN cowl in a translated position.

The second track slider 76 supports the VAFN cowl mount 78 which supports the VAFN cowl 70. The first track slider 74 generally supports the thrust reverse cowl assembly (TR) and the second track slider 76 supports the VAFN cowl 70 such that the thrust reverse cowl and the VAFN cowl 70 may be operated in an independent manner. The first track slider 74 generally supports the thrust reverse cowl assembly (TR) thereby defines the range of movement of the thrust reverse cowl assembly (TR) between the closed position (FIG. 7) and an open position (FIG. 8) generally along the engine axis A. The second track slider 76 thereby defines the range of movement of the VAFN cowl 70 between the closed position (FIG. 7) and an open position (FIG. 8) relative the thrust reverse cowl assembly (TR) generally along the engine axis A.

Figure 9:
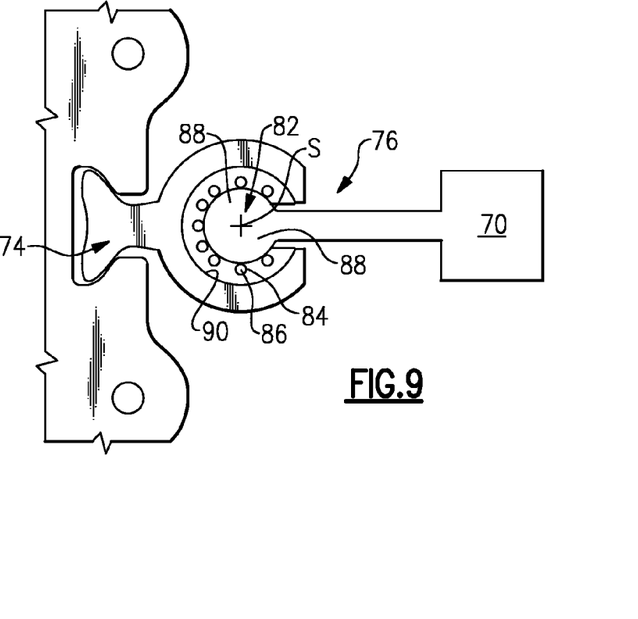
FIG. 9 is a sectional view of a male section of a second track slider and a female section of a first track slider illustrating a bearing assembly according to one non-limiting embodiment.

Referring to FIG. 9, the second interface 82 includes a bearing assembly 84 that includes a multiple of ball bearings 86 between a male section 88 of the second track slider 76 and a female section 90 of the first track slider 74. The bearing assembly 84 may be mounted within the female section 90 of the first track slider 74 and support the multiple of ball bearings 86 arranged in rows spaced about the circumference of the male section 88 along axis S.

The male section 88 of the second track slider 76 interfaces with the female section 90 of the first track slider 74 upon the bearing assembly 84. The male section 88 also may rotate in a radial direction about axis S with respect to female section 90 such that under certain flow conditions the phasing between the unsteady aerodynamic loads and the displacement of the resonant modes of the structure are such that the net work of the fluid on the structure over an oscillation period is greater than zero. When this occurs, the amplitude of the deflections grows substantially over time resulting in high stress in the structure. This phenomenon is referred to as aeroelastic instability or flutter.

Applicant has determined that by closely controlling the tolerance between the male section 88 of the second track slider 76 with the female section 90 of the first track slider 74 through the bearing assembly 84, the aeroelastic instability or flutter of the VAFN cowl 70 is altered to thereby effectively increase the flutter margin. That is, the bearing assembly 84 facilitates low resistance movement of the VAFN cowl 70 along the axis S yet closely controls the rotational movement about axis S such that a fixed boundary condition is maintained in the radial direction about axis S to maintain the airfoil stiffness of the VAFN cowl 70 and advantageously effect the natural frequency and mode shape of the vibration thereof.

Figure 10:
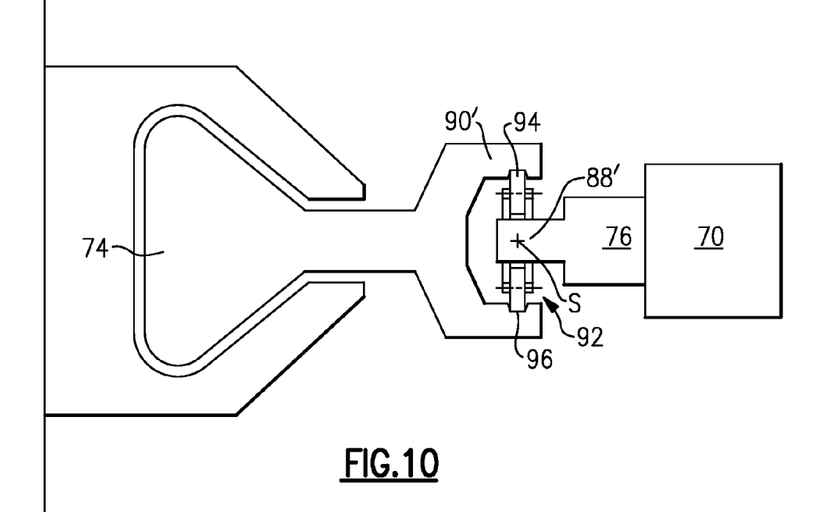
FIG. 10 is a sectional view of a male section of a second track slider and a female section of a first track slider illustrating a bearing assembly according to another non-limiting embodiment.

Referring to FIG. 10, another non-limiting embodiment of the second interface 82 include includes a bearing assembly 92 between a male section 88' of the second track slider 76 and a female section 90' of the first track slider 74. The bearing assembly 92 may include a multiple of rollers 94 which roll generally parallel to axis S and are supported within a track 96 formed by the VAFN cowl 70. That is, the bearing assembly 92 facilitates low resistance movement of the VAFN cowl 70 along axis S while closely controlling the VAFN cowl 70 about axis S in a radial direction.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A variable area fan nozzle (VAFN) for a gas turbine engine comprising:
   a hinge beam;
   a first track slider movable relative to said hinge beam along a first interface between said hinge beam and said first track slider;
   a second track slider movable relative to said first track slider along a second interface between said first track slider and said second track slider that includes a bearing assembly, wherein said bearing assembly includes mechanical bearings; and
   a VAFN cowl mounted to said second track slider.

2. The variable area fan nozzle as recited in claim 1, wherein said second interface includes a male section of said second track slider and a female section of said first track slider.

3. The variable area fan nozzle as recited in claim 2, wherein said bearing assembly is mounted between said male section and said female section.

4. The variable area fan nozzle as recited in claim 3, wherein said male section is a semi-circle in cross section.

5. The variable area fan nozzle as recited in claim 4, wherein said bearing assembly include a multiple of ball bearings arranged in rows spaced about the circumference of the male section.

6. The variable area fan nozzle as recited in claim 1, wherein said bearing assembly include a multiple of roller bearings.

7. The variable area fan nozzle as recited in claim 6, wherein said VAFN cowl supports the second track slider which receives said multiple of roller bearings.

8. The variable area fan nozzle as recited in claim 1, wherein said gas turbine engine includes a bypass ratio greater than about ten (10).

9. The variable area fan nozzle as recited in claim 1, wherein said gas turbine engine includes an epicyclic gear train with a reduction ratio of greater than about 2.5.

10. The variable area fan nozzle as recited in claim 1, wherein said gas turbine engine includes a low pressure turbine with a pressure ratio greater than about five (5).

11. A nacelle assembly for a for a high-bypass gas turbine engine comprising:
   a core nacelle defined about an engine centerline axis;
   a fan nacelle mounted at least partially around said core nacelle to define a fan bypass flow path; and
   a variable area fan nozzle (VAFN) in communication with said fan bypass flow path, said variable area fan nozzle having a first fan nacelle section and a second fan nacelle section, said second fan nacelle section includes a VAFN cowl movable relative to said first fan nacelle section along a track assembly to vary a fan nozzle exit area and adjust fan bypass airflow, said track assembly comprises:
   a hinge beam fixed to said first fan nacelle section;
   a first track slider movable relative to said hinge beam along a first interface between said hinge beam and said first track slider;
   a second track slider movable relative to said first track slider along a second interface between said first track slider and said second track slider that includes a bearing assembly, wherein said bearing assembly includes mechanical bearings, said second track slider mounted to said VAFN cowl.

12. The assembly as recited in claim 11, wherein said first track slider supports a thrust reverser assembly.

13. The assembly as recited in claim 12, wherein said first track slider is independently movable relative said second track slider.

14. The gas turbine engine as recited in claim 13, wherein said gas turbine engine includes a bypass ratio greater than about ten (10).

15. The gas turbine engine as recited in claim 13, wherein said gas turbine engine includes an epicyclic gear train with a reduction ratio of greater than about 2.5.

16. The gas turbine engine as recited in claim 13, wherein said gas turbine engine includes a low pressure turbine with a pressure ratio greater than about five (5).

17. The assembly as recited in claim 11, wherein said second track slider includes a male section with a semi-circular cross section.

18. The assembly as recited in claim 17, wherein said bearing assembly include a multiple of ball bearings arranged in rows spaced about the circumference of the male section.

19. The assembly as recited in claim 11, wherein said bearing assembly include a multiple of roller bearings.

20. The assembly as recited in claim 11, wherein said second track slider moves relative to an axis that is generally parallel to the engine centerline axis.

21. A gas turbine engine comprising:
a core engine defined about an axis;
a gear system driven by said core engine;
a turbofan driven by said gear system about said axis;
a core nacelle defined at least partially about said core engine;
a fan nacelle mounted at least partially around said core nacelle to define a fan bypass flow path; and
a variable area fan nozzle (VAFN) in communication with said fan bypass flow path, said variable area fan nozzle having a first fan nacelle section and a second fan nacelle section, said second fan nacelle section includes a VAFN cowl movable relative to said first fan nacelle section along a track assembly to vary a fan nozzle exit area and adjust fan bypass airflow, said track assembly comprises:
a hinge beam fixed to said first fan nacelle section;
a first track slider movable relative to said hinge beam along a first interface between said first track slider and said second track slider;
a second track slider movable relative to said first track slider along a second interface between said first track slider and said second track slider that includes a bearing assembly, wherein said bearing assembly includes mechanical bearings, said second track slider mounted to said VAFN cowl.

22. The engine as recited in claim 21, wherein said second track slider includes a male section with a semi-circular cross section.

23. The engine as recited in claim 22, wherein said bearing assembly include a multiple of ball bearings arranged in rows spaced about the circumference of the male section.

24. The engine as recited in claim 21, wherein said bearing assembly include a multiple of roller bearings.

* * * * *